United States Patent
Negami

(10) Patent No.: US 12,281,222 B2
(45) Date of Patent: Apr. 22, 2025

(54) RUBBER COMPOSITION FOR TORSIONAL DAMPER

(71) Applicant: NOK CORPORATION, Tokyo (JP)

(72) Inventor: Tetsuro Negami, Tottori (JP)

(73) Assignee: NOK CORPORATION, Tokyo (JP)

( * ) Notice: Subject to any disclaimer, the term of this patent is extended or adjusted under 35 U.S.C. 154(b) by 778 days.

(21) Appl. No.: 17/625,397

(22) PCT Filed: Jun. 22, 2020

(86) PCT No.: PCT/JP2020/024298
§ 371 (c)(1),
(2) Date: Jan. 7, 2022

(87) PCT Pub. No.: WO2021/006018
PCT Pub. Date: Jan. 14, 2021

(65) Prior Publication Data
US 2022/0275185 A1    Sep. 1, 2022

(30) Foreign Application Priority Data

Jul. 8, 2019  (JP) ................................ 2019-127089

(51) Int. Cl.
*C08L 23/16*   (2006.01)

(52) U.S. Cl.
CPC ......... *C08L 23/16* (2013.01); *C08L 2205/035* (2013.01)

(58) Field of Classification Search
CPC ................................................ C08L 2205/035
USPC ....................................... 524/518
See application file for complete search history.

(56) References Cited

U.S. PATENT DOCUMENTS

| | | | |
|---|---|---|---|
| 2015/0001434 A1* | 1/2015 | Nagata | C08L 23/04 252/62 |
| 2016/0177076 A1* | 6/2016 | Negami | C08L 23/16 524/495 |
| 2020/0048446 A1 | 2/2020 | Negami | |

FOREIGN PATENT DOCUMENTS

| | | | |
|---|---|---|---|
| CN | 104854189 A | 8/2015 | |
| EP | 2 810 985 A1 | 12/2014 | |
| EP | 3 613 806 A1 | 2/2020 | |
| JP | 2006-257334 A | 9/2006 | |
| JP | 2014-024929 A | 2/2014 | |
| JP | 2017-183162 | 10/2017 | |
| JP | 2018071703 A * | 5/2018 | ............... C08K 3/04 |
| WO | 2013/114869 | 8/2013 | |
| WO | 2013/114869 A1 | 8/2013 | |
| WO | 2015/012018 | 1/2015 | |
| WO | 2018/079076 | 5/2018 | |

OTHER PUBLICATIONS

International Search Report issued in International Patent Application No. PCT/2020/024298, dated Sep. 8, 2020, along with an English translation thereof.
International Preliminary Report on Patentability in International Application No. PCT/2020/024298, dated Sep. 8, 2020, along with an English translation thereof.

* cited by examiner

*Primary Examiner* — Kelechi C Egwim

(74) *Attorney, Agent, or Firm* — GREENBLUM & BERNSTEIN P.L.C.

(57) ABSTRACT

A rubber composition for a torsional damper, comprising 10 to 200 parts by weight of carbon black having an iodine adsorption of 100 to 600 mg/g, a DBP oil absorption of 138 to 330 $cm^3/100$ g and a nitrogen adsorption specific surface area of 100 to 530 $m^2/g$, and 5 to 100 parts by weight of a liquid polyolefin oligomer having a number average molecular weight Mn of 3,000 to 4,000, based on 100 parts by weight of at least one of ethylene-propylene-non-conjugated diene terpolymer rubber, ethylene-butene-non-conjugated diene terpolymer rubber and ethylene-propylene copolymer rubber, wherein in the total amount of ethylene and propylene or butene, the content of propylene or butene is 35 to 55 wt. %.

9 Claims, No Drawings

RUBBER COMPOSITION FOR TORSIONAL DAMPER

TECHNICAL FIELD

The present invention relates to a rubber composition for a torsional damper. More particularly, the present invention relates to a rubber composition that can provide a torsional damper having excellent damping properties, conductivity and durability.

BACKGROUND ART

For the purpose of reducing engine vibration (reducing torsional vibration of the crankshaft), a torsional damper is attached nearest to the engine at one end of the crankshaft that extends from inside the engine. When interposing a vulcanized rubber layer between the hub part fixed to the crankshaft and the vibration ring (mass part), for example, a function to reduce vibration is exhibited.

Specific examples include a function to reduce the vibration of the crankshaft by matching the natural frequency of the torsional damper with the natural frequency of the crankshaft, and a function to transmit power to auxiliary machinery via the belt.

Rubber materials used for the torsional damper are required to have the following functions.

(1) They should have a hardness variation of about Hs 50 to 85° for natural frequency tuning.

(2) They should have good temperature dependence (E' temperature dependence) of the spring constant of the rubber materials, since the natural frequency is not required to change much depending on the operating temperature.

(3) They should have high tan δ in a wide temperature range in order to reduce the vibration of the crankshaft.

(4) They should have durability and heat resistance of excellent at high temperatures, since the high temperature use area of torsional dampers exceeds 100° C.

(5) They should have conductivity to prevent static electricity.

The applicant of this application has previously proposed an EPDM composition for a torsional damper, comprising 5 to 30 parts by weight of a liquid polyolefin oligomer having a number average molecular weight Mn of 3,000 to 4,000, and 10 to 120 parts by weight of carbon black having a nitrogen adsorption specific surface area of 100 to 150 $m^2/g$, an iodine adsorption of 110 to 160 mg/g, and a DBP oil absorption of 70 to 135 $cm^3/100$ g, based on 100 parts by weight of EPDM having a propylene content of 35 to 50 wt. % (Patent Document 1).

Such a composition can achieve high damping using specific carbon black; however, on the other hand, the amount (part by weight) of carbon black that can be used needs to be small because the durability of the product tends to deteriorate. As a result, there remains the problem that it is difficult to achieve significantly high damping. Therefore, the above requirements (3) and (4) cannot be satisfied.

In recent years, attention has also been paid to the improvement of conductivity. That is, depending on the type of engine, a large friction is generated between the inner surfaces of the timing belt and the damper pulley groove, thereby causing belt slip and the like, which may cause a charging phenomenon in the damper vibration ring. At that time, since a discharge path cannot be secured with conventional rubber materials, there is a concern, due to electric discharge that noise may be generated and that electronic devices (e.g., sensors) around the engine may be affected.

PRIOR ART DOCUMENT

Patent Document

Patent Document 1: WO 2015/012018 A1
Patent Document 2: JP-A-2017-183162

OUTLINE OF THE INVENTION

Problem to be Solved by the Invention

An object of the present invention is to provide a rubber composition that is used as a molding material for a torsional damper having improved damping properties (tan δ), conductivity and durability.

Means for Solving the Problem

The above object of the present invention can be achieved by a rubber composition for a torsional damper, comprising 10 to 200 parts by weight of carbon black having an iodine adsorption of 100 to 600 mg/g, a DBP oil absorption of 138 to 330 $cm^3/100$ g and a nitrogen adsorption specific surface area of 100 to 530 $m^2/g$, and 5 to 100 parts by weight of a liquid polyolefin oligomer having a number average molecular weight Mn of 3,000 to 4,000, based on 100 parts by weight of at least one of ethylene-propylene-non-conjugated diene terpolymer rubber, ethylene-butene-non-conjugated diene terpolymer rubber and ethylene-propylene copolymer rubber, wherein in the total amount of ethylene and propylene or butene, the content of propylene or butene is 35 to 55 wt. %.

Effect of the Invention

Since torsional damper rubber, for which the rubber composition compounded with carbon black having a high DBP oil absorption according to the present invention is used, has a high absolute value of tan δ, particularly tan δ at 60° C., at which torsional dampers are commonly used, crankshaft vibration can be reduced; that is, high damping can be achieved.

Moreover, due to the excellent conductivity, it is possible to secure a discharge path from the vibration ring to the hub side via the rubber material, and it is also possible to prevent electrical discharge noise and influence on electronic devices around the engine.

Furthermore, since the dispersibility of carbon black in the rubber material is also excellent, durability can be improved, which has the effect of making it possible to provide safe and long-life products.

In addition, the addition of graphite improves kneading-roll processability without impairing physical properties. The addition of an aromatic modified terpene resin, which is well compatible with the target polymer, produces an interaction, making it possible to further enhance the damping performance.

Embodiments for Carrying out the Invention

As the polymer, for the purpose of balancing the heat resistance, cold resistance, durability, temperature dependence of the spring constant and repulsive stress, it is preferable to use at least one member selected from the group consisting of EPM (ethylene/propylene copolymer), EPDM (ethylene/propylene/non-conjugated diene terpolymer), and EBDM (ethylene/butene/non-conjugated diene terpolymer). That is, EPM polymer, EPDM polymer and EBDM polymer may be used singly or as a mixture of two or more of them. Typically, each polymer is solid.

In the present embodiments, in the total amount of ethylene, propylene and butene, the content of propylene and/or butene is preferably 35 to 55 wt. %. The "content of propylene and butene" ($C_3+C_4$ content) in each embodiment is shown below.

When EPM, EPDM and EBDM are used as polymer:

$C_3+C_4$ content=(amount of propylene in EPM+ amount of propylene in EPDM+amount of butene in EBDM)/(total amount of ethylene and propylene in EPM+total amount of ethylene and propylene in EPDM+total amount of ethylene and butene in EBDM)×100

When EPM and EPDM are used as polymer:

$C_3+C_4$ content=(amount of propylene in EPM+ amount of propylene in EPDM)/(total amount of ethylene and propylene in EPM+total amount of ethylene and propylene in EPDM)×100

When EPM and EBDM are used as polymer:

$C_3+C_4$ content=(amount of propylene in EPM+ amount of butene in EBDM)/(total amount of ethylene and propylene in EPM+total amount of ethylene and butene in EBDM)×100

When EPDM and EBDM are used as polymer:

$C_3+C_{41}$ content=(amount of propylene in EPDM+ amount of butene in EBDM)/(total amount of ethylene and propylene in EPDM+total amount of ethylene and butene in EBDM)×100

Using the above-mentioned polymer makes it possible to achieve a balance between the heat resistance, cold resistance, durability, temperature dependence (E' temperature dependence) of the spring constant, and repulsive stress. In a more preferred embodiment, the $C_3+C_4$ content is 38 to 55 wt. %, preferably 40 to 55 wt. %. If the $C_3+C_4$ content is more than this range, the low temperature characteristics and roll processability are deteriorated. In contrast, if the $C_3+C_4$ content is less than this range, the low temperature characteristics are deteriorated.

An ethylene-propylene copolymer rubber polymer is used as EPM, and an ethylene-propylene-non-conjugated diene terpolymer rubber polymer is used as EPDM. As the non-conjugated diene, a small amount of dicyclopentadiene, 1,4-hexadiene, dicyclooctadiene, methylene norbornene, vinyl norbornene, ethylidene norbornene, or the like is copolymerized. The Mooney viscosity $ML_{1+4}$ (125° C.) thereof is about 25 to 80, preferably about 25 to 70.

EBDM is described, for example, in Patent Document 2. As the butene, mainly butene-1 is used. Further, as the non-conjugated diene, cyclic or chain non-conjugated dienes, such as 5-ethylidene-2-norbornene and 5-vinyl-2-norbornene, can be used in addition to the above diene compounds; preferably a cyclic non-conjugated diene is used. Such a non-conjugated diene is used in an amount of about 1 to 20 wt. %, preferably about 3 to 15 wt. %, from the viewpoint of fatigue at low temperature. In practice, commercial products, such as EBT produced by Mitsui Chemicals, Inc., can be used as they are.

EBDM has a copolymer composition comprising 50 to 95 mol %, preferably 65 to 95 mol %, of a structural unit derived from ethylene, 4.9 to 49.9 mol %, preferably 4.9 to 35 mol %, of a structural unit derived from butene and 0.1 to 5 mol %, preferably 0.1 to 3 mol %, of a structural unit derived from non-conjugated diene. EBDM is synthesized using a metallocene-based compound, such as (t-butylamide)dimethyl(η5-2-methyl-s-indacen-1-yl)silanetitanium (II) 1,3-pentadine, as a polymerization catalyst.

Further, EPDM, EBDM and EPM may all contain an oil-extended oil such as a mineral oil, a liquid polyolefin oligomer and the like. The ratio of the oil-extended oil to be added is preferably about 5 to 120 parts by weight based on 100 parts by weight of EPDM, EBDM or EPM.

Carbon black and a liquid polyolefin oligomer are compounded with above polymer to form a rubber composition for a torsional damper.

As the carbon black, one having an iodine adsorption of 100 to 600 mg/g, preferably 150 to 450 mg/g, more preferably 170 to 450 mg/g, a DBP oil absorption of 138 to 330 $cm^3$/100 g, preferably 140 to 330 $cm^3$/100 g and a nitrogen adsorption specific surface area of 100 to 530 $m^2$/g, preferably 120 to 400 $m^2$/g, more preferably 160 to 400 $m^2$/g, is used at a ratio of about 10 to 200 parts by weight, preferably about 10 to 160 parts by weight, more preferably 10 to 150 parts by weight, particularly preferably 30 to 150 parts by weight, based on 100 parts by weight of the polymer. Even if the above parts by weight of carbon black is added and used in combination with other carbon black, they can be used in combination as long as the object of the present invention is not impaired.

Here, the iodine adsorption, DBP oil absorption and nitrogen adsorption specific surface area are typical indicators showing the characteristics of carbon black. The iodine adsorption is a value measured according to JIS K6221, the DBP oil absorption is a value measured according to JIS K6221 Method A (mechanical method), and the nitrogen specific surface area is a value measured according to JIS K6217.

The nitrogen adsorption specific surface area is, together with the iodine adsorption, an indicator of the total specific surface area including the pores of carbon black. Further, the DBP oil absorption indirectly quantifies the structure by measuring the porosity between the individual aggregates that have a positive correlation with the structure.

If carbon black whose iodine adsorption and nitrogen adsorption specific surface area are lower than those mentioned above is used, it is difficult to achieve high damping. In contrast, if carbon black whose iodine adsorption and nitrogen adsorption specific surface area are higher than those mentioned above is used, the durability is deteriorated. Further, if carbon black whose DBP oil absorption is outside of the above-mentioned range is used, the durability is inferior.

If carbon black is used at a ratio of less than this range, achievement of high damping and securing of conductivity cannot be satisfied, and the dispersibility of carbon black is deteriorated. In contrast, if carbon black is used at a ratio of more than this range, the kneading properties become problematic.

As the liquid polyolefin oligomer, one having a number average molecular weight Mn of 3,000 to 4,000, preferably 3,000 to 3,900, more preferably 3,500 to 3,900, particularly preferably 3,600 to 3,800, is used; preferably from the viewpoint of achieving high damping, an ethylene-α-olefin oligomer is used at a ratio of about 5 to 100 parts by weight, preferably about 10 to 100 parts by weight, based on 100 parts by weight of the polymer. If the liquid polyolefin oligomer is used at a ratio of less than this range, in addition to the difficulty of achieving desired high damping, the kneading properties are deteriorated. In contrast, if the liquid polyolefin oligomer is used at a ratio of more than this range, the tensile strength and kneading properties become problematic.

The rubber composition comprising the above essential components can be further compounded with graphite at a ratio of about 50 parts by weight or less, preferably about 3 to 50 parts by weight, based on 100 parts by weight of the polymer. Examples of graphite include, expanded graphite, expanding graphite, flake graphite, earthy graphite, and the like; of these, flake graphite is preferable. Due to the addition of such graphite, the kneading properties and roll processability can be further improved. However, if graphite is used at a ratio of more than this range, the dispersibility during kneading and mold contamination become problematic, which is not preferable.

Moreover, for the purpose of further improving the damping properties, an aromatic modified terpene resin can be added at a ratio of about 30 parts by weight or less, preferably about 1 to 30 parts by weight, more preferably about 1 to 20 parts by weight, even more preferably about 1 to 10 parts by weight, based on 100 parts by weight of the polymer. If the aromatic modified terpene resin is used at a ratio of less than 1 part by weight, the effect of improving the damping properties is low. If the aromatic modified terpene resin is used at a ratio of more than this range, the kneading properties or low temperature characteristics become problematic. The aromatic modified terpene resins can be used singly or in combination of two or more. In practice, commercial products, such as products of Yasuhara Chemical Co., Ltd., can be used as they are.

As the crosslinking agent, organic peroxides are mainly preferable. Examples of the organic peroxide include t-butyl peroxide, dicumyl peroxide, 2,5-dimethyl-2,5-di-t-butylperoxyhexane, 2,5-dimethyl-2,5-di-t-butylperoxyhexine-3, t-butylcumyl peroxide, 1,3-di-t-butylperoxyisopropylbenzene, 2,5-dimethyl-2,5-dibenzoylperoxyhexane peroxyketal, peroxyester, and the like.

Usable examples of peroxyketal include n-butyl-4,4-di(t-butylperoxy)valerate, 2,2-di(t-butylperoxy)butane, 2,2-di[4,4-bis(t-butylperoxy)cyclohexyl]propane, 1,1-di(t-butylperoxy)cyclohexane, di(3,5,5-trimethylhexanoyl)peroxide, 1,1-di(t-hexylperoxy)cyclohexane, 1,1-di(t-hexylperoxy)-3,3,5-trimethylcyclohexane, 1,1-di(t-butylperoxy)-2-methylcyclohexane, and the like.

Further, usable examples of peroxyester include t-butyl peroxybenzoate, t-butyl peroxyacetate, t-hexyl peroxybenzoate, t-butyl peroxy-2-ethylhexyl monocarbonate, t-butyl peroxylaurate, t-butyl peroxyisopropyl monocarbonate, t-butyl peroxy-3,5,5-trimethylhexanoate, t-butyl peroxymaleic acid, t-hexyl peroxyisopropyl monocarbonate, and the like.

Regarding the amount of the crosslinking agent to be compounded, it can be added at a ratio of 0.5 to 10 parts by weight, preferably 0.8 to 5 parts by weight, more preferably 1 to 4 parts by weight, particularly preferably 1 to 3.5 parts by weight, based on 100 parts by weight of the polymer. Within the above range, foaming during vulcanization can be prevented to allow molding. In addition, since the crosslink density is good, products having sufficient physical properties become easy to be obtained.

Further, a crosslinking accelerator may be contained, if necessary. As the crosslinking accelerator, triallyl isocyanurate, triallyl cyanurate, liquid polybutadiene, N,N'-m-phenylenedimaleimide, trimethylolpropane trimethacrylate, and the like can be used. By adding an appropriate amount of crosslinking accelerator, the crosslinking efficiency can be improved, and the heat resistance and mechanical properties can also be improved; thus, the stability as a torsional damper component can also be improved.

In addition to the above components, the rubber composition may contain, if necessary, compounding agents generally used in the rubber industry, such as acid acceptors and antioxidants, as rubber compounding agents.

The rubber composition containing the above components is compounded with a white filler as a reinforcing agent, and a vulcanizing agent, such as sulfur or a sulfur-based vulcanizing agent, as well as, if necessary, zinc oxide as a vulcanization aid, a softener, a plasticizer, an anti-aging agent, and the like. Examples of such other compounding agents are shown below. Examples of the plasticizer include petroleum-based softeners, such as process oil, lubricating oil, and paraffin-based oil; fatty oil-based softeners, such as castor oil, linseed oil, rapeseed oil, and coconut oil; ester-based plasticizers, such as dibutyl phthalate, dioctyl phthalate, dioctyl adipate, and dioctyl sebacate; and the like.

As additives other than the above, anti-aging agents (e.g., polymerized 2,2,4-trimethyl-1,2-dihydroquinoline and 2-mercaptobenzimidazole), auxiliaries (e.g., stearic acid), and acid acceptors, such as hydrotalcite, may be used.

The rubber composition can be prepared by kneading various materials using a kneading machine, such as a single-screw extruder, a twin-screw extruder, a roll, a Banbury mixer, a kneader, or a high shear mixer.

The vulcanization molding thereof is carried out by primary vulcanization performed at about 150 to 200° C. for about 3 to 60 minutes and oven vulcanization (secondary vulcanization) optionally performed at about 120 to 200° C. for about 1 to 24 hours.

Such a rubber composition can be used for a torsional damper, and is vulcanized and molded under the above vulcanization conditions, thereby composing a torsional damper. Such a torsional damper shows a minimum value of tan δ at −30 to 120° C. of 0.11 or more, a volume resistivity of 400 Ω·m or less, and the number of strain of 20000 times or more in a constant strain fatigue test (according to JIS K6270).

EXAMPLES

The following describes the present invention with reference to Examples.

Examples 1 to 17 and Comparative Examples 1 to 7

In addition to the compounding contents of the polymer, carbon black, liquid polyolefin oligomer, graphite, aromatic modified terpene resin, and organic peroxide crosslinking agent shown in Tables 1 to 3, any compounding chemical mentioned above was appropriately added to prepare compositions.

In the present embodiment, to produce a rubber composition for a torsional damper, first, an unvulcanized rubber composition was prepared. The rubber composition was prepared, for example, by kneading predetermined raw materials using a kneading machine, such as an intermix, a kneader or a Banbury mixer, or using an open roll. After that, the prepared rubber compound was subjected to primary vulcanization at 180° C. for 6 minutes and secondary vulcanization at 150° C. for 5 hours using a vulcanization press, a compression molding machine, an injection molding machine, or the like to obtain a test piece with a thickness of 2 mm.

Kneading and roll processability were evaluated according to the following criteria.

Kneading-roll processability: Those satisfying all of the following three items were evaluated as ◯, and those not satisfying any one of these items were evaluated as X.

(1) The kneading machine was not contaminated after discharging the rubber compound.

(2) The rubber compound was in close contact with the roll without separating, and the bank rotated smoothly and had good roll processability.

(3) There was good processability without interruption due to rubber compound adhesion during cutting work to improve dispersibility and rolling work such as sheeting.

Evaluation of each Example and each Comparative Example was ◯.

Using the obtained test pieces, the normal value, vibration characteristics, durability and conductivity were measured and evaluated. The obtained results are shown in Tables 1 and 2 (Examples) and Table 3 (Comparative Examples), together with the compounding contents.

Normal value: according to JIS K6253 (hardness) and JIS K6251 (tensile strength, elongation)

Vibration characteristics: Using a strip-shaped test piece with a width of 6 mm and a thickness of 2 mm, measurement was carried out under the following conditions: gripping tool spacing: 20 mm, average strain: 10%, strain amplitude: ±0.1%, vibration frequency: 100 Hz and tension direction, with reference to JIS K6394 corresponding to ISO 4664-1 using a viscoelastic spectrometer DVE-V4 produced by UBM.

tan δ: In a temperature range of −30° C. to 120° C., tan δ was measured from −30° C. at a heating rate of 2° C./min. Of the measurement points, tan δ values at −30° C., 23° C., 60° C. and 120° C., and the minimum tan δ value in the temperature range of −30° C. to 120° C. were used as representative values.

When the value measured at 60° C. was 0.132 or more and the values measured at the other temperatures were 0.110 or more, this case was evaluated as ◉. When the values measured at all the temperatures were 0.110 or more, this case was evaluated as ◯. When the values measured at all the temperatures were less than 0.110, this case was evaluated as X.

E' temperature dependence: In a temperature range of −30° C. to 120° C., E' was measured from −30° C. at a heating rate of 2° C./min. Of the measurement points, E' values at −30° C., 60° C., and 120° C. were used as representative values.

A value of E' (−30° C.)/E' (60° C.) of 10 or less was evaluated as ◉, 25 or less was evaluated as ◯, 60 or less was evaluated as Δ, and more than 60 was evaluated as X.

A value of E' (120° C.)/E' (60° C.) of 0.7 or more was evaluated as ◉, 0.5 or more was evaluated as ◯, 0.3 or more was evaluated as Δ, and less than 0.3 was evaluated as X.

Durability: Using dumbbell-shaped No. 6 type test pieces according to JIS K6251 as samples, a constant strain fatigue test was carried out for 5 samples in an atmosphere of 120° C. at an vibration frequency of 5 Hz under the extension condition of 0 to 60%, with reference to JIS K6270, using a constant strain fatigue tester FT-3103 produced by Ueshima Seisakusho Co., Ltd. to repeat strain fatigue 50,000 times. Then, the median number of times the sample broke was calculated.

(The number of times the sample broke was set to 50,000 for the unbroken product.)

When the number of times was 30,000 or more, this case was evaluated as ◉; when the number of times was 20,000 or more and less than 30,000, this case was evaluated as ◯; when the number of times was 10,000 or more and less than 20,000, this case was evaluated as Δ; and when the number of times was less than 10,000, this case was evaluated as X.

Conductivity: Using test pieces with a width (W) of 20 mm, a length (L) of 100 mm and a thickness (T) of 2 mm, a test was carried out under the following conditions: test temperature: 23° C. and voltage between electrodes: 500 V, with reference to JIS K6271-2 (Parallel terminal electrode system). The insulation resistance value was measured using an insulation resistance tester MY40 produced by Yokogawa Test & Measurement Corporation, and the volume resistivity was calculated according to the following formula:

Volume resistivity ρv (Ω·m)=insulation resistivity $R(\Omega) \times WT/L$

Those with a volume resistivity of 40 Ω·m or less were evaluated as ◉.

Those with a volume resistivity of more than 40 Ω·m and 400 Ω·m or less were evaluated as ◯.

Those with a volume resistivity of more than 400 Ω·m and 1000 Ω·m or less were evaluated as Δ.

Those with a volume resistivity of more than 1000 Ω·m were evaluated as X.

TABLE 1

| Formulation (part by weight) | | Example 1 | Example 2 | Example 3 | Example 4 |
|---|---|---|---|---|---|
| | EPDM (EP33, produced by JSR) | 50 | 50 | 50 | 50 |
| | EPDM (EP35, produced by JSR) | 50 | 50 | 50 | 50 |
| | EBDM(EBT K-9330M, produced by Mitsui Chemicals, Inc.) | | | | |
| | EBDM (EBT K-8370EM, produced by Mitsui Chemicals, Inc.; containing 30 phr of oil-extended oil (mineral oil)) | | | | |
| | Conductive carbon black (Tokablack#5500, produced by Tokai Carbon Co., Ltd.; iodine adsorption: 254 mg/g, DBP oil absorption: 155 cm3/100 g, nitrogen adsorption specific surface area: 225 m2/g) | 45 | 70 | | |
| | Conductive carbon black (Mitsubishi 3230B, produced by Mitsubishi Chemical Corporation; iodine adsorption: 243 mg/g, DBP oil absorption: 140 cm3/100 g, nitrogen adsorption specific surface area: 220 m2/g) | | | 45 | |
| | Conductive carbon black (Mitsubishi 3400B, produced by Mitsubishi Chemical Corporation; iodine adsorption: 184 mg/g, DBP oil absorption: 175 cm3/100 g, nitrogen adsorption specific surface area: 165 m2/g) | | | | 45 |
| | HAF carbon black (Shoblack N330L, produced by Cabot Japan K.K.; iodine adsorption: 81 mg/g, DBP oil absorption: 102 cm3/100 g, nitrogen adsorption specific surface area: 76 m2/g) | | | | |

TABLE 1-continued

| | | | | | |
|---|---|---|---|---|---|
| | Liquid polyolefin oligomer (Lucant HC2000, produced by Mitsui Chemicals, Inc.; Mn 3700) | 10 | 10 | 10 | 10 |
| | Organic peroxide crosslinking agent (DCP) | 3 | 3 | 3 | 3 |
| Polymer composition | C3 + C4 content (wt. %) | 43.4 | 43.4 | 43.4 | 43.4 |
| Oil-extended content | Total mineral oil amount (part by weight) | 0 | 0 | 0 | 0 |
| | Total liquid polyolefin oligomer amount (part by weight) | 10 | 10 | 10 | 10 |
| Normal value | Hardness (Duro A) | 72 | 84 | 72 | 76 |
| | Tensile strength (MPa) | 18.7 | 23.8 | 17.3 | 20.0 |
| | Elongation (%) | 240 | 240 | 220 | 220 |
| Vibration characteristics | tan δ evaluation | ◎ | ◎ | ◎ | ◎ |
| | tan δ @ −30° C. | 0.738 | 0.484 | 0.757 | 0.672 |
| | tan δ @ 23° C. | 0.155 | 0.138 | 0.155 | 0.139 |
| | tan δ @ 60° C. | 0.146 | 0.149 | 0.147 | 0.133 |
| | tan δ @ 23° C. | 0.122 | 0.149 | 0.122 | 0.122 |
| | Minimum tan δ @ −30 to 120° C. | 0.122 | 0.137 | 0.122 | 0.122 |
| | E' (−30° C./60° C.) | ◎ | ◎ | ◎ | ◎ |
| | | 8.17 | 7.13 | 7.74 | 7.15 |
| | E' (120° C./60° C.) | ◎ | ○ | ◎ | ◎ |
| | | 0.78 | 0.64 | 0.79 | 0.76 |
| Durability | Fatigue life | ◎ | ◎ | ◎ | ◎ |
| | (median of N = 5) | 50000 | 50000 | 50000 | 50000 |
| | Number of times of breaking at less than 20,000 | ◎ | ◎ | ◎ | ◎ |
| | | 0 | 0 | 0 | 0 |
| Conducting property | Volume resistivity | ◎ | ◎ | ◎ | ◎ |
| | (Ω · m) | 34.8 | 1.6 | 36.0 | 8.0 |

| | | Example 5 | Example 6 | Example 7 | Example 8 |
|---|---|---|---|---|---|
| Formulation (part by weight) | EPDM (EP33, produced by JSR) | 50 | 50 | | |
| | EPDM (EP35, produced by JSR) | 50 | 50 | 50 | |
| | EBDM (EBT K-9330M, produced by Mitsui Chemicals, Inc.) | | | 50 | |
| | EBDM (EBT K-8370EM, produced by Mitsui Chemicals, Inc.; containing 30 phr of oil-extended oil (mineral oil)) | | | | 130 |
| | Conductive carbon black (Tokablack#5500, produced by Tokai Carbon Co., Ltd.; iodine adsorption: 254 mg/g, DBP oil absorption: 155 cm3/100 g, nitrogen adsorption specific surface area: 225 m2/g) | 100 | 22.5 | 45 | 70 |
| | Conductive carbon black (Mitsubishi 3230B, produced by Mitsubishi Chemical Corporation; iodine adsorption: 243 mg/g, DBP oil absorption: 140 cm3/100 g, nitrogen adsorption specific surface area: 220 m2/g) | | 22.5 | | |
| | Conductive carbon black (Mitsubishi 3400B, produced by Mitsubishi Chemical Corporation; iodine adsorption: 184 mg/g, DBP oil absorption: 175 cm3/100 g, nitrogen adsorption specific surface area: 165 m2/g) | | | | |
| | HAF carbon black (Shoblack N330L, produced by Cabot Japan K.K.; iodine adsorption: 81 mg/g, DBP oil absorption: 102 cm3/100 g, nitrogen adsorption specific surface area: 76 m2/g) | | | | |
| | Liquid polyolefin oligomer (Lucant HC2000, produced by Mitsui Chemicals, Inc.; Mn 3700) | 50 | 10 | 10 | 10 |
| | Organic peroxide crosslinking agent (DCP) | 3 | 3 | 3 | 3 |
| Polymer composition | C3 + C4 content (wt. %) | 43.4 | 43.4 | 47.8 | 46.5 |
| Oil-extended content | Total mineral oil amount (part by weight) | 0 | 0 | 0 | 30 |
| | Total liquid polyolefin oligomer amount (part by weight) | 50 | 10 | 10 | 10 |
| Normal value | Hardness (Duro A) | 79 | 72 | 72 | 66 |
| | Tensile strength (MPa) | 14.8 | 19.6 | 19.6 | 17.8 |
| | Elongation (%) | 340 | 240 | 240 | 390 |
| Vibration characteristics | tan δ evaluation | ◎ | ◎ | ◎ | ◎ |
| | tan δ @ −30° C. | 0.381 | 0.748 | 0.724 | 0.583 |
| | tan δ @ 23° C. | 0.173 | 0.155 | 0.155 | 0.165 |
| | tan δ @ 60° C. | 0.197 | 0.146 | 0.137 | 0.143 |
| | tan δ @ 23° C. | 0.198 | 0.122 | 0.116 | 0.118 |
| | Minimum tan δ @ −30 to 120° C. | 0.169 | 0.122 | 0.116 | 0.118 |
| | E' (−30° C./60° C.) | ◎ | ◎ | ◎ | ◎ |
| | | 7.47 | 7.96 | 7.36 | 5.99 |
| | E' (120° C./60° C.) | ○ | ◎ | ◎ | ◎ |
| | | 0.55 | 0.79 | 0.78 | 0.73 |
| Durability | Fatigue life | ◎ | ◎ | ◎ | ◎ |
| | (median of N = 5) | 50000 | 50000 | 50000 | 50000 |
| | Number of times of breaking at less than 20,000 | ◎ | ◎ | ◎ | ◎ |
| | | 0 | 0 | 0 | 0 |
| Conducting property | Volume resistivity | ◎ | ◎ | ◎ | ◎ |
| | (Ω · m) | 0.4 | 33.6 | 9.2 | 2.4 |

TABLE 2

| | | Example 9 | Example 10 | Example 11 | Example 12 | Example 13 | Example 14 | Example 15 | Example 16 | Example 17 |
|---|---|---|---|---|---|---|---|---|---|---|
| Formulation (part by weight) | EPDM (EP33, produced by JSR) | 50 | 50 | 50 | | | | | 50 | 50 |
| | EPDM (EP35, produced by JSR) | 50 | 50 | 50 | | | | | 50 | 50 |
| | EBDM (VNB-EPT PX-008M, produced by Mitsui Chemicals, Inc.; containing 15 phr of oil-extended oil (liquid polyolefin oligomer)) | | | | 115 | 115 | 115 | 115 | | |
| | Conductive carbon black (Tokablack#5500, produced by Tokai Carbon Co., Ltd.; iodine adsorption: 254 mg/g, DBP oil absorption: 155 cm3/100 g nitrogen adsorption specific surface area: 225 m2/g) | 45 | 45 | 45 | 110 | 110 | 135 | 150 | | |
| | Acetylene black (Denka black Li-435, produced by Denka Co.; iodine adsorption: 180 mg/g, DBP oil absorption: 220 cm3/100 g, nitrogen adsorption specific surface area: 133 m2/g) | | | | | | | | 45 | |
| | Ketjenblack (LIONITE EC200L, produced by LION SPECIALTY CHEMICALS CO., Ltd.; iodine adsorption: 430 mg/g, DBP oil absorption: 280 cm3/100 g, nitrogen adsorption specific surface area: 377 m2/g) | | | | | | | | | 45 |
| | Liq. polyolefin oligomer (Lucent HC2000, produced by Mitsui Chemicals, Inc.; Mn 3700) | 10 | 10 | 10 | 55 | 55 | 70 | 85 | 10 | 10 |
| | Flake graphite (CPB-3S, produced by Chuetsu Graphite Works Co., Ltd.) | | 20 | 10 | | | | | | |
| | Aromatic modified terpene resin (TO-115, produced by Yasuhara Chemical Co., Ltd.) | 20 | | 10 | | | | | | |
| | Organic peroxide crosslinking agent (DOP) | 3 | 3 | 3 | 3 | 2 | 3 | 3 | 3 | 3 |
| Polymer composition | C3 + C4 content (wt. %) | 43.4 | 43.4 | 43.4 | 39.1 | 39.1 | 39.1 | 39.1 | 43.4 | 43.4 |
| Oil-extended content | Total mineral oil amount (part by weight) | 0 | 0 | 0 | 0 | 0 | 0 | 0 | 0 | 0 |
| | Total liquid polyolefin oligomer amount (part by weight) | 10 | 10 | 10 | 70 | 70 | 85 | 100 | 10 | 10 |
| Normal value | Hardness (Duro A) | 65 | 78 | 71 | 73 | 71 | 77 | 76 | 80 | 81 |
| | Tensile strength (MPa) | 17.2 | 19.7 | 19.9 | 13.2 | 10.5 | 10.7 | 8.4 | 19.2 | 20.6 |
| | Elongation (%) | 440 | 250 | 350 | 320 | 400 | 310 | 330 | 203 | 229 |
| Vibration characteristics | tan δ evaluation | ◎ | ◎ | ◎ | ◎ | ◎ | ◎ | ◎ | ○ | ○ |
| | tan δ @ −30° C. | 0.569 | 0.680 | 0.716 | 0.326 | 0.316 | 0.273 | 0.267 | 0.597 | 0.584 |
| | tan δ @ 23° C. | 0.214 | 0.160 | 0.183 | 0.185 | 0.182 | 0.170 | 0.179 | 0.138 | 0.131 |
| | tan δ @ 60° C. | 0.177 | 0.156 | 0.170 | 0.207 | 0.209 | 0.199 | 0.209 | 0.126 | 0.131 |
| | tan δ @ 120° C. | 0.171 | 0.139 | 0.156 | 0.195 | 0.202 | 0.196 | 0.209 | 0.122 | 0.122 |
| | Minimum tan δ @ −30 to 120° C. | 0.171 | 0.139 | 0.156 | 0.176 | 0.173 | 0.159 | 0.167 | 0.122 | 0.122 |
| | E' (−30° C./60° C.) | Δ | ◎ | ○ | ◎ | ◎ | ◎ | ◎ | ◎ | ◎ |
| | | 42.3 | 9.13 | 18.1 | 7.32 | 7.55 | 6.97 | 7.56 | 7.34 | 7.00 |
| | E' (120° C./60° C.) | ◎ | ◎ | ◎ | ○ | ○ | ○ | ○ | ○ | ◎ |
| | | 0.70 | 0.72 | 0.70 | 0.58 | 0.57 | 0.54 | 0.50 | 0.68 | 0.70 |
| Durability | Fatigue life (median of N = 5) | ◎ 50000 | ◎ 50000 | ◎ 50000 | ◎ 50000 | ◎ 50000 | ◎ 50000 | ◎ 50000 | ◎ 50000 | ◎ 50000 |
| | Number of times of breaking at less than 20,000 | ◎ 0 | ○ 1 | ◎ 0 | ◎ 0 | ◎ 0 | ◎ 0 | ◎ 0 | Δ 2 | ○ 1 |
| Conducting property | Volume resistivity (Ω · m) | ○ 174.0 | ◎ 9.6 | ○ 43.6 | ◎ 0.8 | ◎ 0.8 | ◎ 0.4 | ◎ 0.4 | ◎ 3.6 | ◎ 1.2 |

TABLE 3

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Formulation (part by weight) | EPDM(EP33, produced by JSR) | 50 | 50 | 50 | 50 | 50 | 50 | 50 |
| | EPDM (EP35, produced by JSR) | 50 | 50 | 50 | 50 | 50 | 50 | 50 |
| | Conductive carbon black (Tokablack#5500, produced by Tokai Carbon Co., Ltd.; iodine adsorption: 254 mg/g, DBP oil absorption: 155 cm3/100 g, nitrogen adsorption specific surface area: 225 m2/g) | | | | | 5 | 45 | |

TABLE 3-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
|  | HAF carbon black (Shoblack N330L, produced by Cabot Japan KK; iodine adsorption: 81 meg, DBP oil absorption: 102 cm3/100 g, nitrogen adsorption specific surface area: 76 m2/g) | 45 |  |  |  | 40 |  |  |
|  | ISAF-LS Seasto00, produced by Tokai Carbon Co., nitrogen Ltd.; Iodine absorption: 111 mg/g, DBP oil absorption: 75 cm3/100 g, adsorption specific surface area: 106 m2/g) |  | 45 |  |  |  |  |  |
|  | Carbon black (Tokablack #8300, produced by Tokai Carbon Co., Ltd.; for coloring; iodine adsorption: 236 mg/g, DBP oil absorption: 76 cm3/100 g, nitrogen adsorption specific surface area: 244 m2/g) |  |  | 45 |  |  |  |  |
|  | Conductive carbon black (Tokablack#4500, produced by Tokai Carbon Co.. Ltd.; iodine adsorption: 63 mg/g, DBP oil absorption: 168 cm3/100 g, nitrogen adsorption specific surface area: 58 m2/g) |  |  |  | 45 |  |  |  |
|  | Conductive carbon black (Ketjen black EC300J, produced by LION SPECIALTY CHEMICALS CO., Ltd.; iodine adsorption: 800 mg/g, DBP oil absorption: 365 cm3/100 g, nitrogen adsorption specific surface area: 800 m2/g) |  |  |  |  |  |  | 45 |
|  | Liquid polyolefin oligomer (Lucant HC2000, produced by Mitsui Chemicals. Inc.; Mn 3700 | 10 | 10 | 10 | 10 | 10 |  | 10 |
|  | Organic peroxide crosslinking agent (DCP) | 3 | 3 | 3 | 3 | 3 | 3 | 3 |
| Polymer composition | C3 + C4 content (wt.%) | 43.4 | 43.4 | 43.4 | 43.4 | 43.4 | 43.4 | 43.4 |
| Oil-extended content | Total mineral oil amount (part by weight) | 0 | 0 | 0 | 0 | 0 | 0 | 0 |
|  | Total liquid polyolefin oligomer amount (part by weight) | 10 | 10 | 10 | 10 | 10 | 0 | 10 |
| Normal value | Hardness (Duro A) | 70 | 68 | 70 | 73 | 70 | 78 | 88 |
|  | Tensile strength (MPa) | 16.8 | 17.7 | 19.4 | 18.9 | 18.7 | 20.2 | 21.3 |
|  | Elongation (%) | 200 | 240 | 360 | 200 | 210 | 190 | 222 |
| Vibration characteristics | tan δ evaluation | X | ◎ | ◎ | X | X | X | ◎ |
|  | tan δ @ −30° C. | 0.857 | 0.811 | 0.647 | 0.828 | 0.844 | 0.707 | 0.397 |
|  | tan δ @ 23° C. | 0.157 | 0.164 | 0.170 | 0.146 | 0.156 | 0.128 | 0.121 |
|  | tan δ @ 60° C. | 0.130 | 0.143 | 0.169 | 0.123 | 0.132 | 0.117 | 0.136 |
|  | tan δ @ 120° C | 0.107 | 0.117 | 0.135 | 0.104 | 0.109 | 0.104 | 0.137 |
|  | Minimum tan δ @ −30 to 120° C. | 0.107 | 0.117 | 0.135 | 0.104 | 0.109 | 0.104 | 0.121 |
|  | E' (−30° C./60° C.) | ◎ | ◎ | ◎ | ◎ | ◎ | ◎ | ◎ |
|  |  | 8.21 | 8.86 | 9.37 | 8.33 | 8.20 | 9.94 | 6.74 |
|  | E' (120° C./60° C.) | ◎ | ◎ | ◎ | ◎ | ◎ | ◎ | ○ |
|  |  | 0.86 | 0.82 | 0.74 | 0.85 | 0.86 | 0.80 | 0.60 |
| Durability | Fatigue life | ◎ | X | X | ◎ | ◎ | ◎ | X |
|  | (median of N = 5) | 33140 | 2035 | 6186 | 50000 | 50000 | 50000 | 1375 |
|  | Number of times of breaking at less than 20,000 | △ | X | X | ◎ | △ | ○ | X |
|  |  | 2 | 5 | 5 | 0 | 2 | 1 | 5 |
| Conducting property | Volume resistivity | X | ○ | ◎ | ○ | △ | ◎ | ◎ |
|  | (Ω · m) | 1120 0 | 156.0 | 16.8 | 68.0 | 424.0 | 6.8 | 0.4 |

The invention claimed is:

1. A rubber composition for a torsional damper, comprising 10 to 200 parts by weight of carbon black having an iodine adsorption of 100 to 600 mg/g, a DBP oil absorption of 138 to 330 cm$^3$/100 g and a nitrogen adsorption specific surface area of 100 to 530 m$^2$/g, and 5 to 100 parts by weight of a liquid polyolefin oligomer having a number average molecular weight Mn of 3,000 to 4,000, based on 100 parts by weight of at least one of ethylene-propylene-non-conjugated diene terpolymer rubber, ethylene-butene-non-conjugated diene terpolymer rubber and ethylene-propylene copolymer rubber, wherein in the total amount of ethylene and propylene or butene, the content of propylene or butene is 35 to 55 wt. %.

2. The rubber composition for a torsional damper according to claim 1, wherein carbon black having an iodine adsorption of 150 to 450 mg/g, a DBP oil absorption of 138 to 330 cm$^3$/100 g and a nitrogen adsorption specific surface area of 120 to 400 m$^2$/g is used.

3. The rubber composition for a torsional damper according to claim 1, wherein carbon black having an iodine adsorption of 170 to 450 mg/g, a DBP oil absorption of 140 to 330 cm$^3$/100 g and a nitrogen adsorption specific surface area of 160 to 400 m$^2$/g is used.

4. The rubber composition for a torsional damper according to claim 1, wherein 50 parts by weight or less of graphite is further comprised.

5. The rubber composition for a torsional damper according to claim 1, wherein 30 parts by weight or less of aromatic modified terpene resin is further comprised.

6. A torsional damper comprising a vulcanization molding of the rubber composition for a torsional damper according to claim 1.

7. The torsional damper according to claim 6, wherein the minimum value of tan δ at −30 to 120° C. is 0.110 or more and a volume resistivity is 400 Ω·m or less and a constant strain fatigue is 20,000 times or more.

8. A torsional damper comprising a vulcanization molding of the rubber composition for a torsional damper according to claim 4.

9. A torsional damper comprising a vulcanization molding of the rubber composition for a torsional damper according to claim 5.

\* \* \* \* \*